United States Patent
Sugiyama et al.

(10) Patent No.: US 10,649,467 B2
(45) Date of Patent: May 12, 2020

(54) OPERATION MANAGEMENT SYSTEM FOR AUTONOMOUS MOBILE ROBOTS

(71) Applicant: HONDA MOTOR CO., LTD., Tokyo (JP)

(72) Inventors: Kenichiro Sugiyama, Saitama (JP); Soshi Iba, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 316 days.

(21) Appl. No.: 15/821,968

(22) Filed: Nov. 24, 2017

(65) Prior Publication Data

US 2018/0203462 A1    Jul. 19, 2018

(30) Foreign Application Priority Data

Jan. 16, 2017   (JP) .................. 2017-005224

(51) Int. Cl.
*G05B 19/418*   (2006.01)
*G05D 1/02*     (2020.01)

(52) U.S. Cl.
CPC ........... *G05D 1/0287* (2013.01); *G05D 1/027* (2013.01); *G05D 1/0274* (2013.01); *G05D 1/0297* (2013.01); *G05D 1/0246* (2013.01); *G05D 2201/0211* (2013.01)

(58) Field of Classification Search
CPC .. G05D 1/0287; G05D 1/0297; G05D 1/0246; G05D 2201/0211; G05D 1/0274; G05D 1/027
See application file for complete search history.

(56) References Cited

U.S. PATENT DOCUMENTS

| | | | |
|---|---|---|---|
| 9,749,460 B2* | 8/2017 | Okamoto | H04W 4/027 |
| 2016/0129592 A1* | 5/2016 | Saboo | G06Q 50/28 |
| | | | 700/248 |
| 2018/0021942 A1* | 1/2018 | Hummel | A47L 9/2884 |
| | | | 700/253 |

FOREIGN PATENT DOCUMENTS

| | | | |
|---|---|---|---|
| JP | 2008-134904 A | 6/2008 | |
| JP | 2008-152504 | 7/2008 | |
| JP | 2009-174898 | 8/2009 | |
| JP | 2010-231698 | 10/2010 | |
| JP | 2016-028326 | 2/2016 | |
| KR | 101638679 B1 * | 7/2016 | .............. B25J 13/08 |
| WO | 02/23297 | 3/2002 | |

* cited by examiner

*Primary Examiner* — Harry Y Oh
*Assistant Examiner* — Sohana Tanju Khayer
(74) *Attorney, Agent, or Firm* — Rankin, Hill & Clark LLP

(57) ABSTRACT

An operation management system includes: a plurality of robots; and an operation management unit server configured to manage an operation route in a predetermined region. Each robot has a sensor that recognizes a surrounding environment. When the sensor of a first robot recognizes a predetermined surrounding environment, the server refers to a position of the surrounding environment and sets an operation route of a second robot.

5 Claims, 8 Drawing Sheets

FIG.1
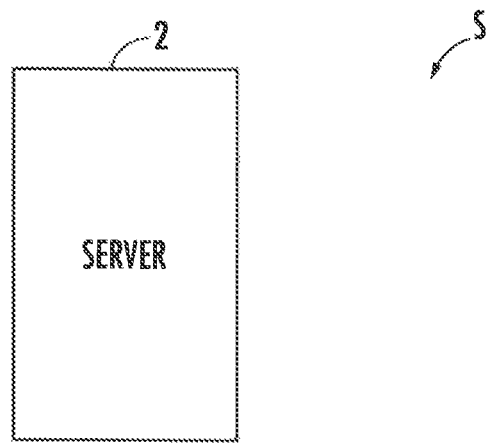
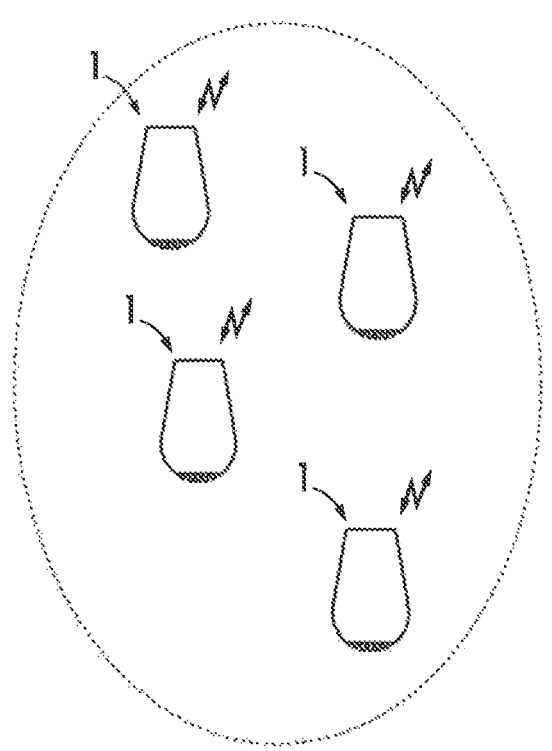

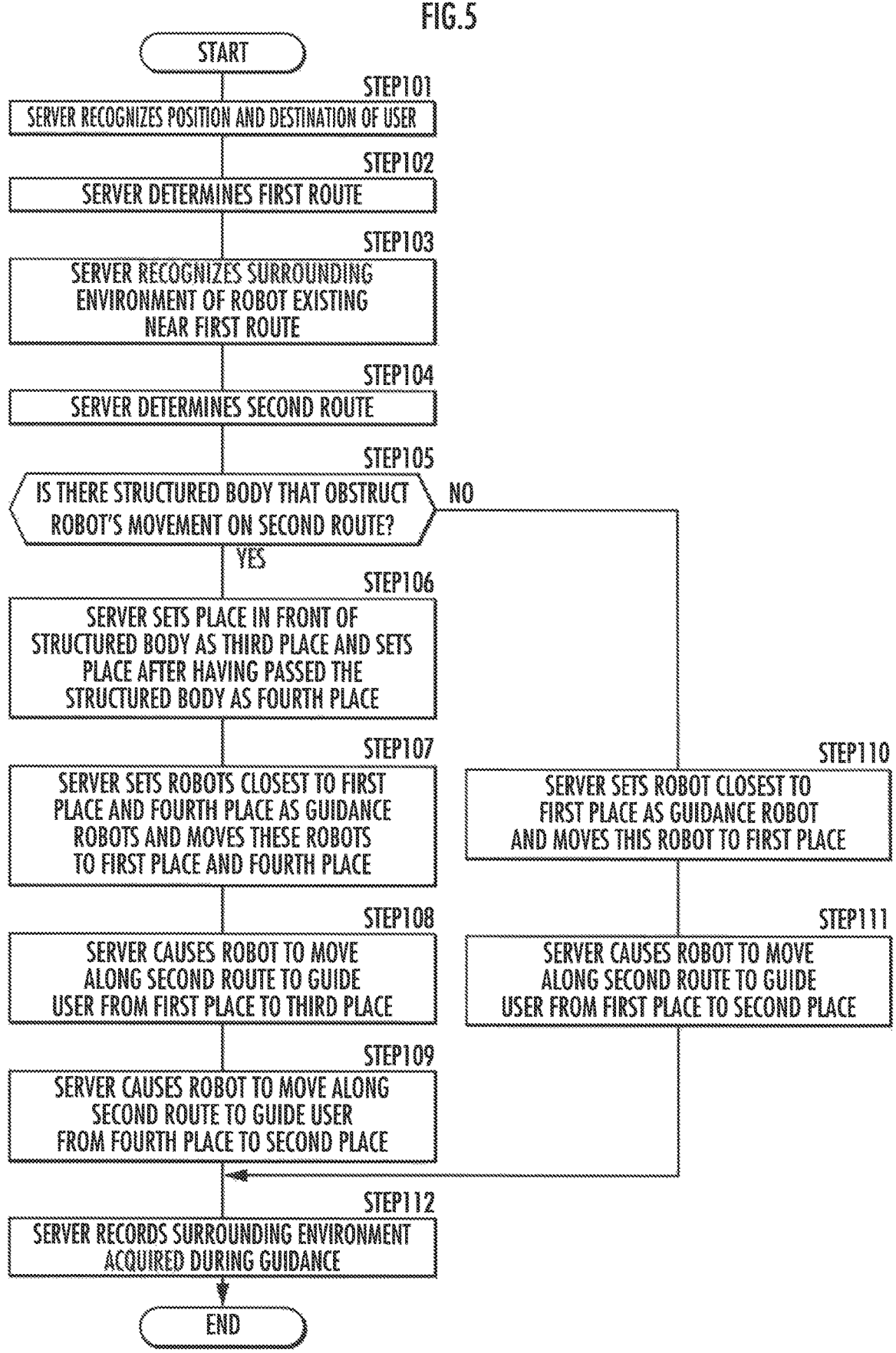

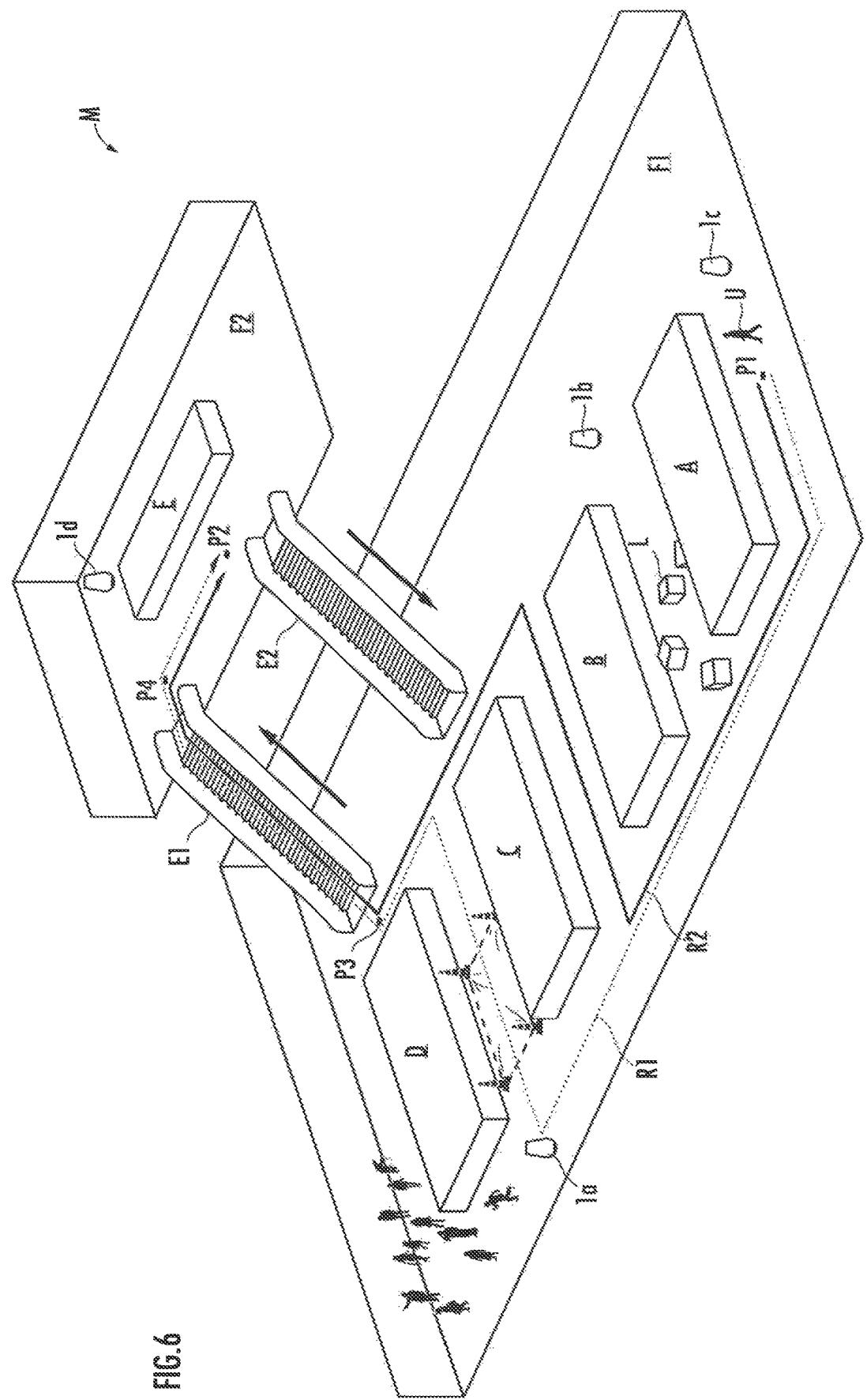

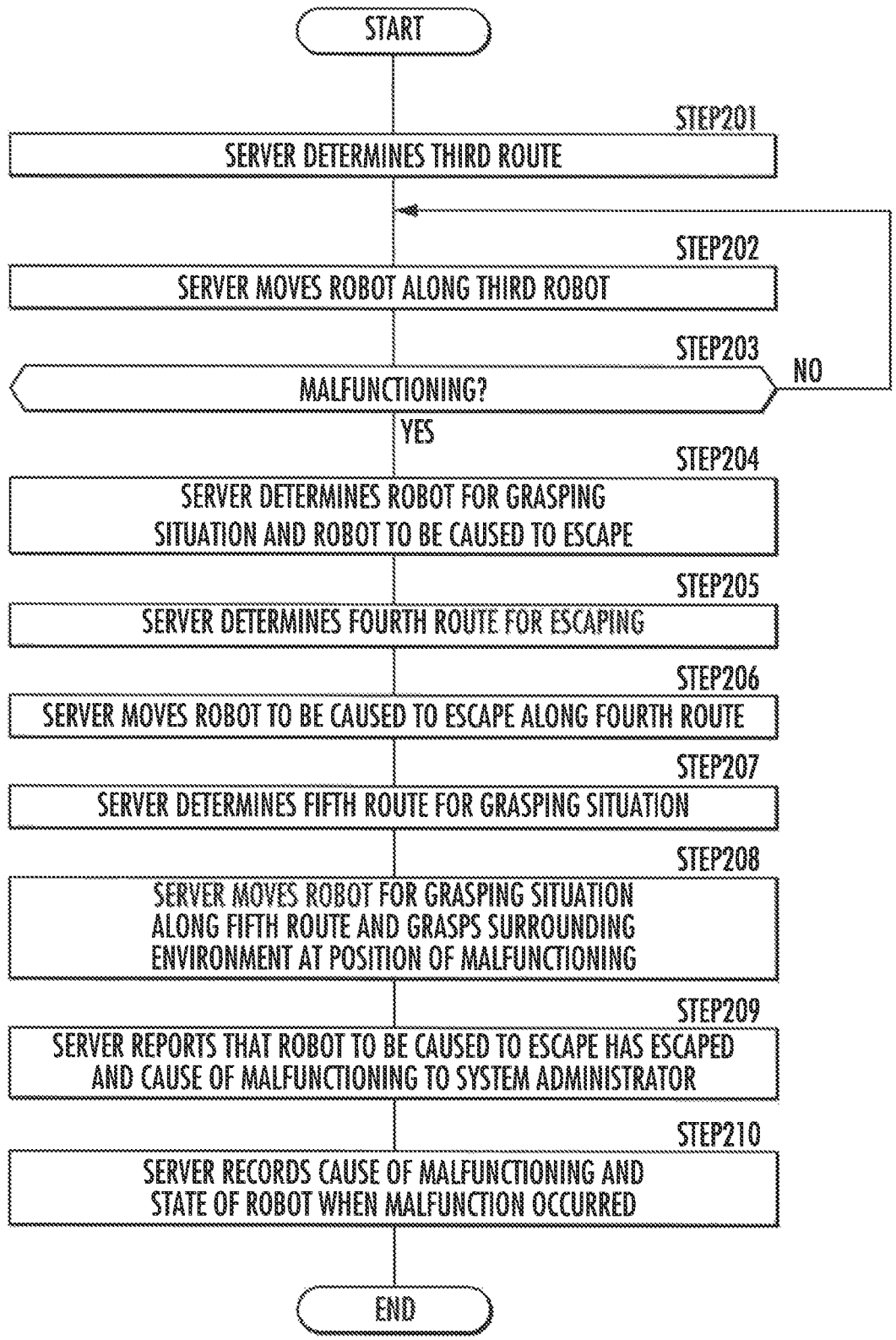

OPERATION MANAGEMENT SYSTEM FOR AUTONOMOUS MOBILE ROBOTS

BACKGROUND OF THE INVENTION

Field of the Invention

The present invention relates to an operation management system for autonomous mobile robots which manages an operation route for a plurality of autonomous mobile robots in a predetermined region.

Description of the Related Art

Conventionally, there is a known a system including a plurality of autonomous mobile robots, a home base server that manages an operation route of each autonomous mobile robot in a predetermined region, and a central server that collects and processes information from the home base server (for example, see Japanese Patent Laid-Open No. 2016-028326, which is hereinafter referred to as Patent Literature 1).

In the operation management system for autonomous mobile robots disclosed in Patent Literature 1, the central server collects information detected by a sensor implemented in each autonomous mobile robot via the home base server, and performs processing of giving a priority to each piece of information based on a predetermined condition.

By referring to such pieces of information given the priorities, an administrator of the operation management system for autonomous mobile robots can adequately wasp a problem that should be preferentially solved among problems which each autonomous mobile robot is facing.

SUMMARY OF THE INVENTION

However, a conventional operation management system for autonomous mobile robots as disclosed in Patent Literature 1 is a system for recognizing a problem occurred on a predefined operation route. Hence, until a system administrator solves the problem, operation of each autonomous mobile robot is needed to be suspended, or the system administrator is needed to separately set a different operation route.

Therefore, with such conventional operation management system for autonomous mobile robots, in the case where it may take time to solve arisen problems due to reasons such as the number of administrators is insufficient with respect to the number of arising problems, there was a problem that it was not able to continue to operate the autonomous mobile robots smoothly.

The present invention has been made in view of the aforementioned circumstances, and an object thereof is to provide an operation management system for autonomous mobile robots capable of continuously operating the autonomous mobile robots smoothly even in the case of occurrence of problems disturbing the operation of the autonomous mobile robots.

In order to achieve the aforementioned object, there is provided an operation management system for autonomous mobile robots of the present invention, including: a plurality of autonomous mobile robots and an operation management unit configured to manage an operation route for the autonomous mobile robots in a predetermined region, wherein each autonomous mobile robot has a sensor that recognizes a surrounding environment of the autonomous mobile robot, and when the sensor of a first autonomous mobile robot of the plurality of autonomous mobile robots recognizes a predetermined surrounding environment, the operation management unit refers to a position of the surrounding environment and sets an operation route of a second autonomous mobile robot of the plurality of autonomous mobile robots.

Here, the "operation management unit" may include a processing unit or the like constituted of a plurality of control devices implemented in respective robots, as well as a server separately provided from the autonomous mobile robots (hereinafter, sometimes referred to simply as "robots"), and only has to integrally process pieces of information transmitted from the robots.

As above, in the operation management system for autonomous mobile robots of the present invention (hereinafter, sometimes referred to simply as "operation management system"), the operation management unit sets an operation route of a predetermined robot (second robot) by referring to a surrounding environment recognized by a sensor implemented in another robot (first robot).

Therefore, according to the operation management system of the present invention, the operation route of another robot is automatically changed in accordance with factors recognized in real time by the sensor of the actually moving robot. Hence, the robot can be continuously and smoothly operated even in the case of a problem occurs which disturbs the operation of the robot.

Moreover, in the operation management system for autonomous mobile robots of the present invention, each autonomous mobile robot may be used as a guidance robot that guides a user to a destination of the user.

As above, when the robot managed by the operation management system of the present invention is used as a guidance robot (robot moving to lead a user), the user who is guided by the operation of the robot can also move smoothly.

Moreover, in the operation management system for autonomous mobile robots of the present invention, it is preferable that in a case the autonomous mobile robot is used as a guidance robot, the operation management unit is configured to set, in a case the sensor of the first autonomous mobile robot recognizes a surrounding environment which disturbs movement of the autonomous mobile robot, an operation route of the second autonomous mobile robot so as to cause the second autonomous mobile robot guiding the user to make a detour off a position of the surrounding environment.

In general, a surrounding environment which disturbs movement of the robot also highly possibly disturbs movement of the user. Therefore, as above, if an operation route is set for making a detour off the surrounding environment which disturbs movement of the robot, the surrounding environment does not disturb movement of the user. As a result, the user can more smoothly move.

Moreover, in the operation management system for autonomous mobile robots of the present invention, it is preferable in a case the autonomous mobile robot is used as a guidance robot, the operation management unit is configured to set, in a case a surrounding environment which does not disturb movement of the user but disturbs movement of the second autonomous mobile robot guiding the user is recognized, an operation route of a third autonomous mobile robot of the plurality of autonomous mobile robots so as to cause the third autonomous mobile robot guiding the user after the second autonomous mobile robot to move to a position past the surrounding environment.

There are surrounding environments of topography on which a robot is difficult to move but a user is not so difficult to move, for example, an escalator or the like. When the first robot beforehand recognizes such a surrounding environment, an operation route can be set such that a third robot moves in advance to a position past the surrounding environment (for example, the destination of an escalator). Thereby, the user guided by the second robot can be taken over by the third robot, which enables to continue the guidance without a large time lag.

Namely, by having a configuration in which a problem due to travelling performance of a robot is relieved by a plurality of robots working together, a waiting time of the user caused by the problem can be shorten. As a result, the user can further smoothly move.

Moreover, in the operation management system for autonomous mobile robots of the present invention, the predetermined surrounding environment may be defined as a surrounding environment where the autonomous mobile robot malfunctions or a surrounding environment where the autonomous mobile robot is forcibly moved.

As the "predetermined surrounding environment", various ones can be defined, for example, a congestion situation of humans or a construction site or the like, depending on the operation purpose of robots. Among those, the surrounding environment where the robot malfunctions or the surrounding environment where the robot is forcibly moved (that is, a surrounding environment where the robot itself malfunctions) has to be prevented for robots for any operation purpose. Therefore, the "predetermined surrounding environment" may include such surrounding environments.

Moreover, in the operation management system for autonomous mobile robots of the present invention, in the case where the predetermined surrounding environment includes a surrounding environment Where the robot itself malfunctions, it is preferable that the operation management unit is configured to set, in a case the sensor of the first autonomous mobile robot recognizes the predetermined surrounding environment, an operation route of the second autonomous mobile robot so as to cause the second autonomous mobile robot to make a detour off the surrounding environment or to move away from the surrounding environment.

When the surrounding environment where the robot itself malfunctions is recognized, there is a concern that a phenomenon arising in the surrounding environment causes malfunctioning of other robots coming close to the surrounding environment. Therefore, a robot (second robot) other than the robot (first robot) that has recognized the surrounding environment can be caused to move away from the surrounding environment or to make a detour. Therefore, malfunction of the plurality of robots due to the phenomenon arising in the surrounding environment can be prevented.

Moreover, in the operation management system for autonomous mobile robots of the present invention, in the case where the predetermined surrounding environment includes a surrounding environment where the robot itself malfunctions, it is preferable that the operation management unit is configured to set, in a case the sensor of the first autonomous mobile robot recognizes the predetermined surrounding environment, an operation route of the second autonomous mobile robot so as to cause the second autonomous mobile robot to move near a position where the surrounding environment is recognized.

When the surrounding environment where the robot itself malfunctions is recognized, a situation may arise where the robot (first robot) that has recognized the surrounding environment cannot continue the recognition of the surrounding environment. Therefore, a robot (second robot) different from the first robot can be caused to move near the surrounding environment, thereby, enabling the second robot to recognize the surrounding environment. Thus, robots other than the first robot and the second robot can be more easily prevented from malfunctioning.

Moreover, even in the case where the first robot can continue to recognize the surrounding environment, when a robot (second robot) different from the first robot is caused to move near the surrounding environment, the surrounding environment can be recognized from various angles by a plurality of robots. Therefore, a system administrator or the like can easily recognize the cause of abnormality (predetermined surrounding environment) which is hard to recognize by a fixedly installed monitoring camera and the like.

Moreover, in the operation management system for autonomous mobile robots of the present invention, in the case where the predetermined surrounding environment includes a surrounding environment Where the robot itself malfunctions, it is preferable that the sensor includes an acceleration sensor that measures an acceleration of the autonomous mobile robot, and the operation management unit is configured to recognize, in a case a change pattern of the measured acceleration is different from a change pattern of a predefined target acceleration, that the predetermined surrounding environment is reached.

In general, when an autonomous mobile robot travels on a predetermined operation route, target accelerations of the robot at individual points on the operation route are predefined along with the operation route. Therefore, with these target accelerations being as references, determination of whether a malfunction has occurred or not (predetermined surrounding environment or not) can be easily made without implementing any separate special device.

Moreover, in the operation management system for autonomous mobile robots of the present invention, in the case where the predetermined surrounding environment includes a surrounding environment where the robot itself malfunctions, it is preferable that the sensor includes an acceleration sensor that measures an acceleration of the autonomous mobile robot and a position sensor that measures a current position of the autonomous mobile robot, and the operation management unit is configured to recognize, in a case a current position of the autonomous mobile robot which is estimated based on the acceleration, is different from the measured current position thereof, that the predetermined surrounding environment is reached.

The current position of the robot can be estimated based on the acceleration (specifically, for example, by double integration of the acceleration). Thus, by comparing the position measured by the position sensor with the position estimated from the measurement result of the acceleration sensor, determination of malfunctioning or not (predetermined surrounding environment or not) can be easily made without implementing any separate special device.

Moreover, in the operation management system for autonomous mobile robots of the present invention, in the case where the predetermined surrounding environment includes a surrounding environment where the robot itself malfunctions, it is preferable that the operation management unit is configured to record, in a case the predetermined surrounding environment is recognized, a measurement result of the sensor of the autonomous mobile robot that has recognized the predetermined surrounding environment.

As above, by recording malfunctioning (predetermined surrounding environment), for example, it becomes possible to set an operation route by referring to the record, thereby enabling to cause the robots to further smoothly operate.

BRIEF DESCRIPTION OF THE DRAWINGS

FIG. 1 is an explanatory diagram schematically showing a configuration of an operation management system for autonomous mobile robots according to an embodiment;

FIG. 5 is a flowchart showing processing performed when the operation management unit of the operation management system for autonomous mobile robots in FIG. 1 guides a user;

FIG. 6 is a schematic diagram showing operation routes set when the operation management unit of the operation management system for autonomous mobile robots in FIG. 1 guides the user;

FIG. 7 is a flowchart showing processing performed when the operation management unit of the operation management system for autonomous mobile robots in FIG. 1 performs patrol security; and FIG. 8A and FIG. 8B are schematic diagrams showing operation routes set when the operation management unit of the operation management system for autonomous mobile robots in FIG. 1 performs patrol security, in which FIG. 8A shows an operation route in a normal situation, and FIG. 8B shows an operation route in occurrence of malfunctioning.

DETAILED DESCRIPTION OF THE PREFERRED EMBODIMENTS

Hereafter, an operation management system for autonomous mobile robots according to an embodiment of the present invention (hereinafter referred to simply as "operation management system") is described with reference to the drawings.

First, referring to FIG. 1 to FIG. 4, a schematic configuration of an operation management system S is described.

As shown in FIG. 1, the operation management system S includes a plurality of robots 1 which autonomously move in a predetermined region (autonomous mobile robots), and a server 2 (operation management unit) which mutually communicates with the robots 1 and manages operations of the robots 1.

Figure 2:
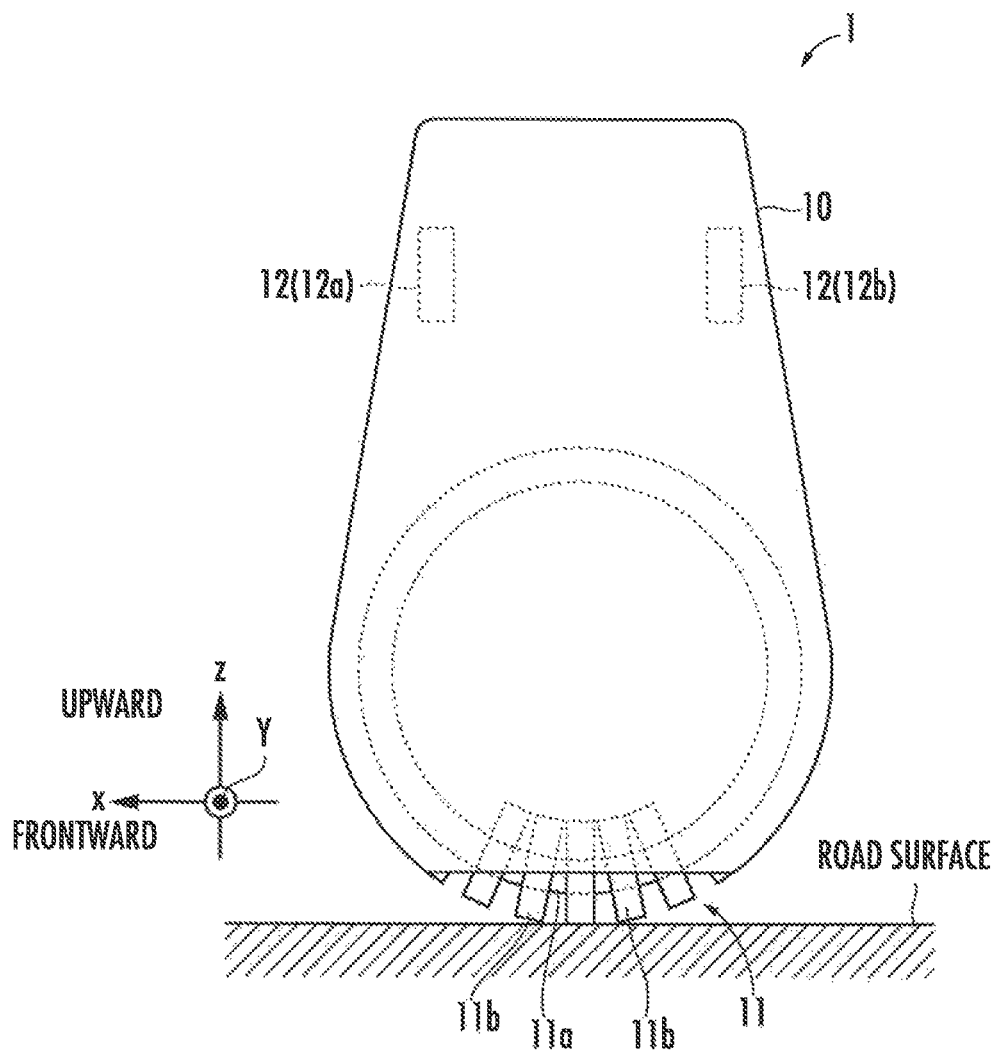
FIG. 2 is a lateral view showing an example of the autonomous mobile robot of the operation management system for autonomous mobile robots in FIG. 1.

As shown in FIG. 2, the robot 1 which is a so-called inverted pendulum vehicle includes a base body 10, and a moving operation part 11 which can move on a road surface.

The robot 1 can move on the road surface with the moving operation part 11 in all the directions (in arbitrary direction). The moving operation part 11 has an annular core body 11a, a plurality of annular rollers 11b which are arranged at the same angular intervals in the circumferential direction of the core body 11a (direction around the axis center) and through which the core body 11a is inserted. FIG. 2 representatively shows only a part of the rollers 11b.

Each roller 11b can rotate integrally with the core body 11a around the axis center of the core body 11a. Moreover, each roller 11b can rotate around the center axis in the sectional face of the core body 11a at the arrangement position of each roller 11b (axis of the tangential direction of the circumference around the axis center of the core body 11a).

The moving operation part 11 configured as above can move on the road surface in all the directions by both or one of rotary driving of the core body 11a around its axis center and rotary driving of each roller 11b around its axis center in the state where lower rollers 11b are in contact with the road surface (a floor surface, a ground surface or the like) in a movement environment of the robot 1.

An actuator device 12 which generates driving force for moving the moving operation part 11 is implemented inside the base body 10. The actuator device 12 may be constituted of a first actuator 12a, which rotationally drives the core body 11a, and a second actuator 12b which rotationally drives each roller 11b. The first actuator 12a and the second actuator 12b may be configured, for example, using electric motors, hydraulic actuators or the like.

The first actuator 12a and the second actuator 12b give rotary driving force to the core body 11a and each roller 11b respectively via power transmission mechanisms which are omitted from the drawing. The power transmission mechanism may employ any known structure.

Figure 3:
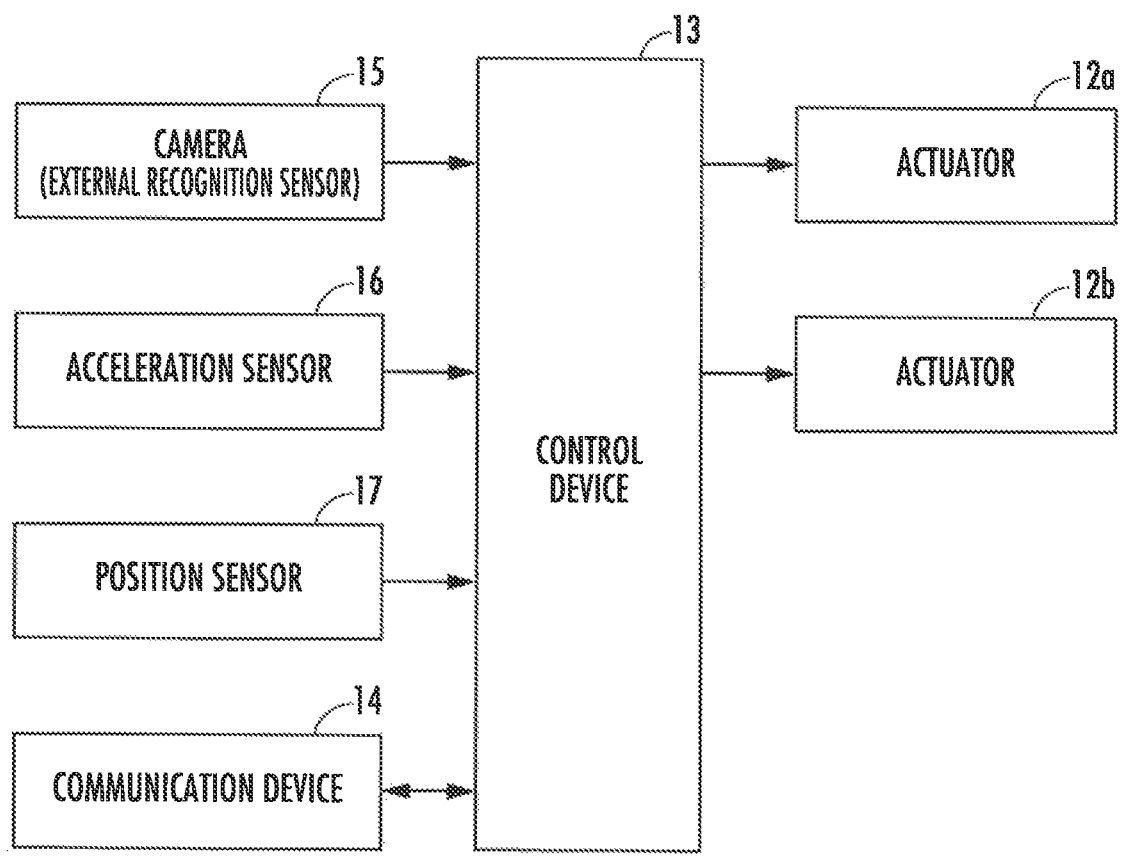
FIG. 3 is a block diagram showing a configuration regarding operation control of the autonomous mobile robot in FIG. 2.

While omitted from FIG. 2, as shown in FIG. 3, in the robot 1, a control device 13 constituted of an electronic circuit unit including a CPU, a RAM, a ROM, an interface circuit and the like, various sensors for observing the operation state of the robot 1, an external state (surrounding environment) thereof or the like, and a communication device 14 for performing wireless communication between the server 2 and the control device 13, are implemented as constituent components for operation control of the robot 1.

The sensors implemented in the robot 1 include, for example, a camera 15 as an external recognition sensor for recognizing objects (humans, moving objects, installed objects and the like) existing in the surrounding environment of the robot 1, an acceleration sensor 16 for detecting an acceleration of the robot 1, a position sensor 17 for detecting its own position of the robot 1, and the like. Outputs of these sensors (detection data) are input to the control device 13.

The external recognition sensor may be any sensor which is able to recognize the surrounding environment of the robot 1. Therefore, the external recognition sensor can also employ, in place of the camera 15 or in addition to the camera 15, for example, a ranging sensor such as a laser range finder, a radar device, or the like.

The control device 13 has, as a function realized by an implemented hardware configuration or program (software configuration), a function of performing operation control of the first actuator 12a and the second actuator 12b (consequently, movement control of the moving operation part 11).

Figure 4:
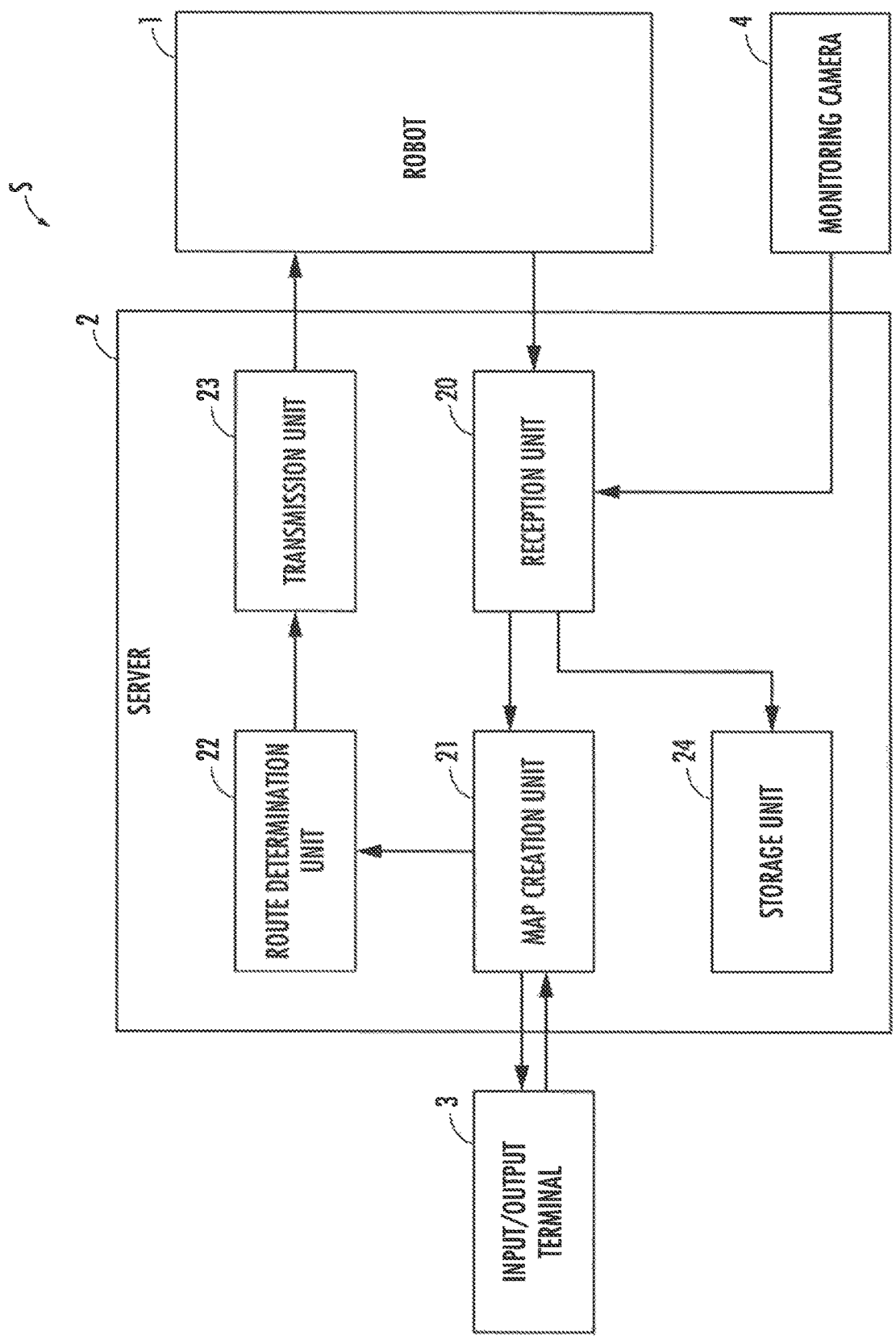
FIG. 4 is a block diagram showing a configuration of an operation management unit of the operation management system for autonomous mobile robots in FIG. 1.

As shown in FIG. 4, the server 2 has, as functions realized by an implemented hardware configuration or program, a reception unit 20 which receives information regarding the surrounding environment of the robot 1, a map creation unit 21 which creates a map based on the information received by the reception unit 20 and information inputted via an input/output terminal 3, a route determination unit 22 which determines an operation route of each robot 1, a transmission unit 23 which transmits information to each robot, and a storage unit 24 which stores the state of each robot 1. Processing of these functional units is sequentially executed.

The reception unit 20 receives information acquired by the various sensors implemented in the robot 1, and information acquired by a monitoring camera 4 and the like set in a region where the robot 1 moves (that is, information regarding the surrounding environment of each robot 1).

The map creation unit 21 creates a map of the region where the robot 1 moves (that is, where an operation of the robot 1 is performed) based on the information received by the reception unit 20, and information inputted by a system administrator or the like via the input/output terminal 3.

Here, the map created by the map creation unit 21 is input with information of existences which affect movement of the robot 1. Specifically, the map is input with, for example, information regarding a structured body such as a structure of a building itself, whose position or shape does not change due to factors such as nine elapse, information regarding a semi-structured body such as a construction site, whose position or shape changes due to factors such as time elapse and timing of the change can be acquired beforehand, information regarding a non-structured body such as a congestion situation of humans, whose position or shape changes due to factors such as time elapse and timing of the change is hardly acquired or cannot be acquired.

Moreover, addition and deletion of the information in the map are performed, immediately before the route determination unit 22 sets an operation route, during the operation of the robot 1 after the operation route has been set, immediately after the robot 1 completes the operation on the set operation route, and the like.

The route determination unit 22 refers to the map created by the map creation unit 21 and determines an operation route of each robot 1.

The storage unit 24 stores, at a predetermined timing, the state of the robot 1 and the information regarding the surrounding environment detected by the sensor implemented in the robot 1. The predetermined timing is, for example, timing immediately before the robot 1 starts to move on the operation route, timing immediately after the robot 1 completes movement on the operation route, timing when it is recognized that the robot 1 is malfunctioning, or the like.

The transmission unit 23 transmits the route determined by the route determination unit 22 to each robot.

Next, referring to FIG. 5 to FIG. 8A and FIG. 8B, processing performed by the operation management system S is described. Herein, a case of guiding a user to a destination store and a case of performing patrol security in a shopping mall M, are exemplarily described.

First, referring to FIG. 5 and FIG. 6, processing performed in the case where the operation management system S sets operation routes of a robot 1c and a robot 1d in order to guide a user U from a first place P1 (near a store A) toward a second place P2 (near a store E) is described. FIG. 5 is a flowchart showing processing performed by the server 2 in this case.

First, the server 2 recognizes the first place 1 which is the current position of the user U and the second place P2 which is the destination based on the information recognized by robots 1a, 1b, 1c and 1d moving along defined operation routes, the information input via the input/output terminal 3, and the like (FIG. 5/STEP 101).

Next, the server 2 determines a route on which movement of the user U can be considered to be most smoothly performed as a first route R1 based on a map in which known information such as information regarding structured bodies and semi-structured bodies in the shopping mall M is described (FIG. 5/STEP 102).

Here, the structured body refers to what does not change its position, shape, and the like due to factors such as elapse of time. In the present embodiment, the structured bodies correspond to stores A, B, C, D and E, an up-escalator E1, a down-escalator E2 and the like. The semi-structured body changes its position, shape, and the like due to factors such as elapse of time, and timing of the change can be acquired beforehand. In the present embodiment, the semi-structured body corresponds to a construction site between the store C and the store D.

Next, the server 2 recognizes current information near the first route R1 (surrounding environments of the robots 1a and 1b, such as non-structured bodies) via the robots 1a and 1b (first robots) existing near the first route R1 (FIG. 5/STEP 103).

Here, the non-structured body refers to what changes its position and shape due to factors such as elapse of time, and timing of the change is hardly acquired beforehand or cannot be acquired. In the present embodiment, the non-structured bodies correspond to many humans existing in the periphery of the store D, packages L, and the like to be transported which are between the store A and the store B.

Next, the server 2 determines a second route R2 on which the user U is to be actually guided based on the known information (information regarding the structured bodies and the semi-structured bodies) and the newly acquired information (information regarding the non-structured bodies) (FIG. 5/STEP 104).

The second route R2 determined in this stage is determined by modifying the first route R1 on which the user U can most smoothly move in the case of not considering surrounding environments disturbing the movement, in consideration of the surrounding environments which disturb the movement and are recognized immediately before the start of guidance (in the present embodiment, the construction site between the store C and the store D, and the many humans existing in the periphery of the store D), so as to make a detour.

In general, a surrounding environment which disturbs movement of the robot 1a, 1b, 1c, 1d which is an autonomous mobile robot also highly possibly disturbs movement of the user U. Therefore, as above, if an operation route for making a detour off the surrounding environments which disturb movement of the robot 1a, 1b, 1c, 1d is set as the second route R2 for actually performing the operation, the movement of the user U is also not disturbed by such surrounding environments.

Next, the server 2 determines whether or not there exists a structured body or the like on which the robot 1a, 1b, 1c, 1d which can be a guiding robot cannot move (for example, the up-escalator E1 for moving from the first floor F1 to the second floor F2) on the second route R2 based on at least one of the known information and the information recognized by the robots 1a, 1b, 1c and 1d (FIG. 5/STEP 105).

When it is determined that there exists a structured body on which the robots 1a, 1b, 1c and 1d cannot move on the second route R2 (YES in STEP 105), the server 2 sets a place beforehand of that structured body as a third place P3, and sets a place after having passed by the structured body as a fourth place P4 (FIG. 5/STEP 106).

Next, the server 2 sets the robot 1c currently existing closest to the first place P1 and the robot 1d which is currently closest to the fourth place P4 and exists in a region after having passed by the structured body which is determined not to be able to move thereon, as robots (a second robot and a third robot) for guiding the user U. The server 2 causes the robot 1c to move to the first place P1, and causes the robot 1d to move to the fourth place P4 (FIG. 5/STEP 107).

Next, the server 2 causes the robot 1c to move along the second route R2 so as to lead the user U from the first place P1 toward the third place P3 to guide the user U (FIG. 5/STEP 108).

Next, after the user U goes up on the up-escalator E1 (specifically, after the robot 1d waiting at the fourth place P4 recognizes the user U), the server 2 causes the robot 1d to move along the second route R2 so as to lead the user U from the fourth place P4 toward the second place P2 to guide the user U (FIG. 5/STEP 109).

The operation management system S is configured to cause a plurality of robots (in the present embodiment, the robot 1c and the robot 1d) to guide a user U in accordance with the situation of a structured body or the like as in STEP 106 to STEP 109.

Thereby, even when there exists a topography, such as the up-escalator E1, on which the guiding robot 1c is difficult to move but the user U is not so difficult to move (that is, when there exists a problem based on the travelling performance of the robot 1a, 1b, 1c, 1d which can perform guidance), the robots 1a, 1b, 1c and 1d work together, and thereby, a waiting time of the user U due to that problem is shortened.

On the other hand, when it is determined that there does not exists a structured body on which the robots 1a, 1b, 1c and 1d cannot move on the second route R2 for the reason that the robots 1a, 1b, 1c and 1d can move on the up-escalator E1 or the like (NO in STEP 105), the robot 1c currently existing closest to the first place P1 is set as a robot (second robot) for guiding the user U, and causes the robot 1c to move to the first place P1 (FIG. 5/STEP 110).

Next, the server 2 causes the robot 1c to move along the second route R2 so as to lead the user U from the first place P1 toward the second place P2 to guide the user U (FIG. 5/STEP 111).

Finally, the server 2 stores the surrounding environments acquired by the robots 1c and 1d which have performed the guidance in the occasion of the guidance on the second route R2, and ends the current processing (FIG. 5/STEP 112).

To store the surrounding environments may be performed during the guidance, other than in the stage of the end of the guidance. Thereby, when the robots 1a and 1b, other than the robots 1c and 1d which are currently guiding, start to guide, a route for guidance can be set using the currently newest information.

As described above, in the operation management system S, the server 2 sets the second route R2 which is an operation route of the robots 1c and 1d (second robots) with reference to the surrounding environments recognized by the sensors implemented in the other robots 1a and 1b (first robots).

Namely, with the operation management system S, the first route R1 which is a predefined operation route is automatically changed to the second route R2 which is an appropriate operation route in accordance with factors recognized in real time by the sensors of the actually moving robots 1a and 1b. As a result, the user U who is guided by operations of the robots 1c and 1d which are managed by the operation management system S can smoothly move to the destination.

Figure 8A:
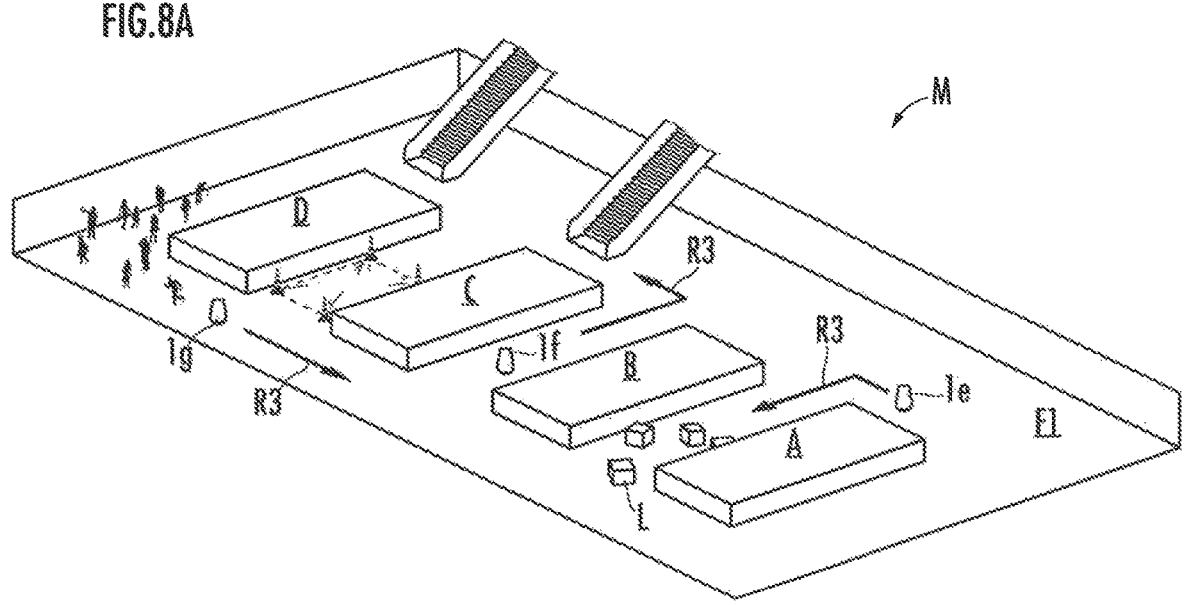
Figure 8B:
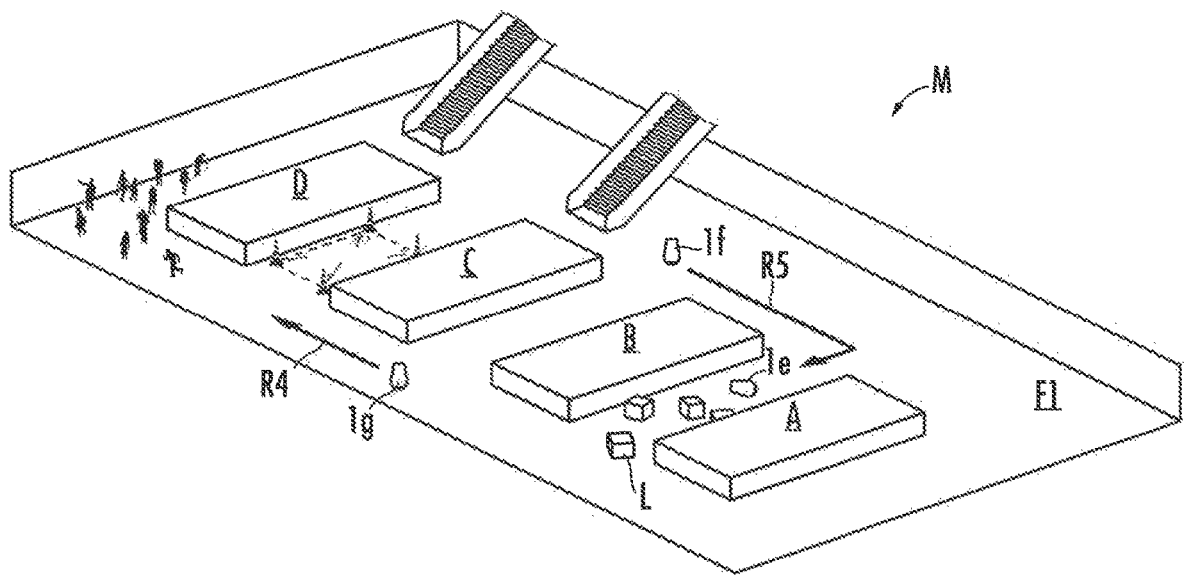

Next, referring to FIG. 7, FIG. 8A and FIG. 8B, processing performed by the operation management system S in the case of setting operation routes of robots 1e, 1f and 1g in order to perform patrol security inside the shopping mall M with the robots 1e, 1f and 1g is described. FIG. 7 is a flowchart showing processing performed by the server 2 in this case.

First, as shown in FIG. 8A, the server 2 sets a third route R3 which is a route for the robots 1e, 1f and 1g to perform patrol security (FIG. 7/STEP 201).

Next, the server 2 causes the robots 1e, 1f and 1g to move along the third route R3 (FIG. 7/STEP 202).

Next, the server 2 determines whether or not any of the robots 1e, 1f and 1g is malfunctioning (FIG. 7/STEP 203).

Here, "malfunctioning" means that the robot 1e, 1f, 1g is in a surrounding environment where it goes failure, or that the robot 1e, 1f, 1g is in a surrounding environment where it is forcibly moved. For example, it corresponds to the situation in which the robot 1e, 1f, 1g cannot move for some reason or in which the robot 1e, 1f, 1g is taken away (lifted and moved).

In the present embodiment, a state where the robot 1e collides with the packages L which are piled up between the store A and the store B, falls down and cannot move is defined as a "state of malfunctioning".

As a determination method of malfunctioning or not, there may be employed a method, for example, in which a change pattern of accelerations when the robots 1e, 1f and 1g are moving on the third route R3 set by the server 2 (that is, accelerations set by the server 2) is compared with a change pattern of accelerations detected by the acceleration sensors 16 implemented in the actually moving robots 1e, 1f and 1g, and malfunctioning is determined when these change patterns are different from each other.

In the operation management system S, when the robots 1e, 1f and 1g travel on the third route R3, target accelerations of the robots 1e, 1f and 1g at individual points on the operation route are predefined. Therefore, determination of malfunctioning can be made only with acceleration sensors typically implemented in the robots 1e, 1f and 1g by determining malfunctioning or not (to be in a predetermined surrounding environment or not) with such target accelerations being as references.

As another determination method of malfunctioning or not, there may be employed a method, for example, in which current positions estimated based on the accelerations detected by the acceleration sensors 16 of the robots 1e, 1f and 1g are compared with current positions detected by the position sensors 17 implemented in the robots 1e, 1f and 1g, and malfunctioning is determined when these positions are different from each other.

The current position of the robot 1e, 1f, 1g can be estimated based on its acceleration (specifically, for example, by double integration of the acceleration). Thus, the measured position is compared with the estimated position to determine malfunctioning or not (to be in a predetermined surrounding environment or not), and therefore, it is able to determine malfunctioning only by a position sensor and an acceleration sensor typically implemented in the robot 1e, 1f, 1g.

As a determination method of malfunctioning, any other method can be properly employed depending on a surrounding environment which is defined as malfunctioning.

When it is determined that there is no malfunctioning (NO in STEP 203), the process is returned to STEP 202 to continue movements of the robots 1e, 1f and 1g.

When it is determined that malfunctioning has occurred (YES in STEP 203), the server 2 sets the robot 1f closest to the robot 1e which is malfunctioning as a robot caused to grasp the situation, and sets the other robots (in the present embodiment, the robot 1g) as robots caused to escape (FIG. 7/STEP 204).

Next, as shown in FIG. 8B, the server 2 refers to the position where the robot 1e is malfunctioning to cause the robot 1g to leave and escape apart from the position, or determines a fourth route R4 which is a route for detouring the position and escaping (FIG. 7/STEP 205).

Next, the server 2 causes the robot 1g to move along the fourth route R4, and caused the robot 1g to escape (FIG. 7/STEP 206).

Next, the server 2 refers to the position where the robot 1e is malfunctioning, and determines a fifth route R5 which is a route for causing the robot 1f to go toward and close to a position where the sensor can detect that position (for example, a position where the implemented camera 15 can capture an image of that position) (FIG. 7/STEP 207).

Next, the server 2 causes the robot 1f to move along the fifth route R5, and causes the robot 1f to acquire the surrounding environment of the robot 1e which is malfunctioning (FIG. 7/STEP 208).

Next, the server 2 reports to a system administrator via the input/output terminal 3 that the robot 1g is caused to escape, and reports the surrounding environment (that is, the cause of malfunctioning) recognized by the robot 1f via input/output terminal 3 (FIG. 7/STEP 209).

Finally, the server 2 stores the cause of malfunctioning, and the state of the robot 1e when the malfunctioning occurred into the storage unit 24, and ends the processing (FIG. 7/STEP 210).

As described above, in the operation management system 5, the server 2 sets the fourth route R4 and the fifth route R5 which are operation routes of the robots 1f and 1e (second robots) by referring to a surrounding environment (that is, malfunctioning of the robot 1e) recognized by a sensor implemented in the other robot 1e (first robot).

Namely, with the operation management system 5, the third route R3 which is a predefined operation route is automatically changed to the fourth route R4 which is a route for escaping in accordance with factors recognized in real time by the sensor of the robot 1e which is actually malfunctioning. As a result, malfunctioning of another robot (in the present embodiment, the robot 1g) can be prevented.

Moreover, with the operation management system S, the third route R3 which is the predefined operation route is automatically changed to the fifth route R5 which is a route for grasping the situation in accordance with factors recognized in real time by the sensor of the robot 1e which is actually malfunctioning. As a result, even if the situation cannot be grasped by the sensor of the robot 1e which is malfunctioning, a fixed monitoring camera, or the like, another robot the present embodiment, the robot 1f) can adequately grasp the situation.

While with the operation management system S, the robot 1g is caused to escape and the robot 1f is caused to grasp the situation, both of the robot 1g and the robot 1f may be caused to escape, or both of them may be caused to move for grasping the situation.

Moreover, with the operation management system S, the server 2 stores the situation of the robot 1e when the malfunction occurred into the storage unit 24. The reason for this is to set a route for making a detour off a situation to prevent malfunctioning when a situation similar to such situation is recognized in setting an operation route later. Nevertheless, in the case where the operation management system S is a system with which a system administrator is monitoring all the time or the like, such record is not necessary.

As above, the embodiments shown in the drawings have been described. However, the present invention is not limited to such embodiments.

For example, while in the aforementioned embodiments, inverted pendulum vehicles are employed as the autonomous mobile robots, the autonomous mobile robots in the present invention only have to be autonomously movable. For example, bipedal humanoid robots may be employed as the autonomous mobile robots.

Moreover, while in the aforementioned embodiments, the server 2, which is a terminal independent of the robots, is employed as the operation management unit, the operation management unit of the present invention only has to collect information from each robot to set an operation route of the robot based on the information. For example, a processing unit constituted of a plurality of control devices implemented in respective robots may be employed as the operation management unit.

Moreover, in the aforementioned embodiments, the case where the operation management system is a system for managing operations of the robots 1 for guiding a user or for performing patrol security in the shopping mall M is described. Nevertheless, the operation management system for autonomous mobile robots of the present invention is not limited to systems for such purposes, but may be any system for managing operations of a plurality of robots. For example, the operation management system for autonomous mobile robots of the present invention may be employed as a system for causing autonomous mobile robots to perform aid activities in the event of a natural disaster.

REFERENCE SIGNS LIST 1, 1a, 1b, 1c, 1d, 1e, 1f, 1g Robot (autonomous mobile robot)
2 Server (operation management unit)
3 Input/output terminal
4 Monitoring camera
10 Base body
11 Moving operation part
11a Core body
11b Roller
12 Actuator device
12a First actuator
13 Control device
14 Communication device
15 Camera
16 Acceleration sensor
17 Position sensor
20 Reception unit
21 Map creation unit
22 Route determination unit
23 Transmission unit
24 Storage unit
A, B, C, D, E Store
E1 Up-escalator
E2 Down-escalator
F1 First floor
F2 Second floor
L Package
M Shopping mall
P1 First place
P2 Second place
P3 Third place
P4 Fourth place
R1 First route
R2 Second route
R3 Third route
R4 Fourth route
R5 Fifth route S Operation management system (operation management system for autonomous mobile robots)
U User

What is claimed is:

1. An operation management system for autonomous mobile robots, comprising:
    a plurality of autonomous mobile robots, each of the plurality of autonomous mobile robots is a guidance robot that guides a user to a destination of the user; and
    an operation management server configured to manage an operation route for the autonomous mobile robots in a predetermined region, wherein
    each autonomous mobile robot has a sensor that recognizes a surrounding environment of the autonomous mobile robot,
    when the sensor of a first autonomous mobile robot of the plurality of autonomous mobile robots recognizes a predetermined surrounding environment, the operation management server refers to a position of the surrounding environment and sets an operation route of a second autonomous mobile robot of the plurality of autonomous mobile robots, and
    the operation management server is configured to set, in a case a surrounding environment which does not disturb movement of the user but disturbs movement of the second autonomous mobile robot guiding the user is recognized, an operation route of a third autonomous mobile robot of the plurality of autonomous mobile robots so as to cause the third autonomous mobile robot guiding the user after the second autonomous mobile robot to move to a position past the surrounding environment.

2. An operation management system for autonomous mobile robots, comprising:
    a plurality of autonomous mobile robots; and
    an operation management server configured to manage an operation route for the autonomous mobile robots in a predetermined region, wherein
    each autonomous mobile robot has a sensor that recognizes a surrounding environment of the autonomous mobile robot,
    when the sensor of a first autonomous mobile robot of the plurality of autonomous mobile robots recognizes a predetermined surrounding environment, the operation management server refers to a position of the surrounding environment and sets an operation route of a second autonomous mobile robot of the plurality of autonomous mobile robots,
    the predetermined surrounding environment is a surrounding environment where the autonomous mobile robot malfunctions or a surrounding environment where the autonomous mobile robot is forcibly moved, and
    the operation management server is configured to set, in a case the sensor of the first autonomous mobile robot recognizes the predetermined surrounding environment, the operation route of the second autonomous mobile robot so as to cause the second autonomous mobile robot to move near a position where the surrounding environment is recognized.

3. The operation management system for autonomous mobile robots according to claim 2, wherein
    the sensor includes an acceleration sensor that measures an acceleration of the autonomous mobile robot, and
    the operation management server is configured to recognize, in a case a change pattern of the measured acceleration is different from a change pattern of a predefined target acceleration, a surrounding environment at a position where the change pattern is measured as the predetermined surrounding environment.

4. The operation management system for autonomous mobile robots according to claim 2, wherein
    the sensor includes an acceleration sensor that measures an acceleration of the autonomous mobile robot and a position sensor that measures a current position of the autonomous mobile robot, and
    the operation management server is configured to recognize, in a case a current position of the autonomous mobile robot which is estimated based on the acceleration is different from the measured current position thereof, a surrounding environment at the measured current position as the predetermined surrounding environment.

5. The operation management system for autonomous mobile robots according to claim 2, wherein
    the operation management server is configured to record, in a case the predetermined surrounding environment is recognized, a measurement result of the sensor of the autonomous mobile robot that has recognized the predetermined surrounding environment.

* * * * *